Oct. 6, 1970   N. A. GOWANS   3,531,957
DOOR LOCKING SYSTEM
Original Filed Dec. 15, 1967
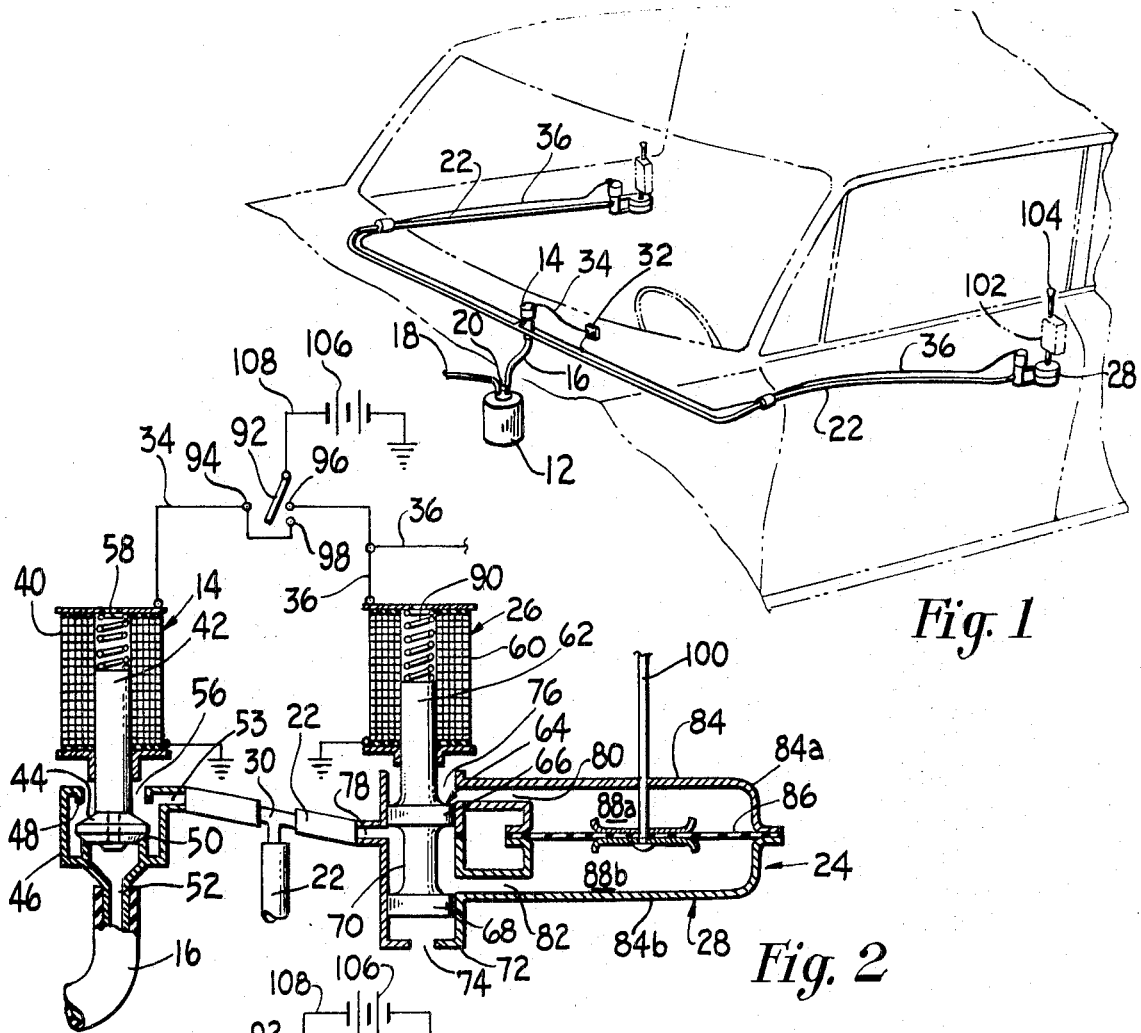
Fig. 1
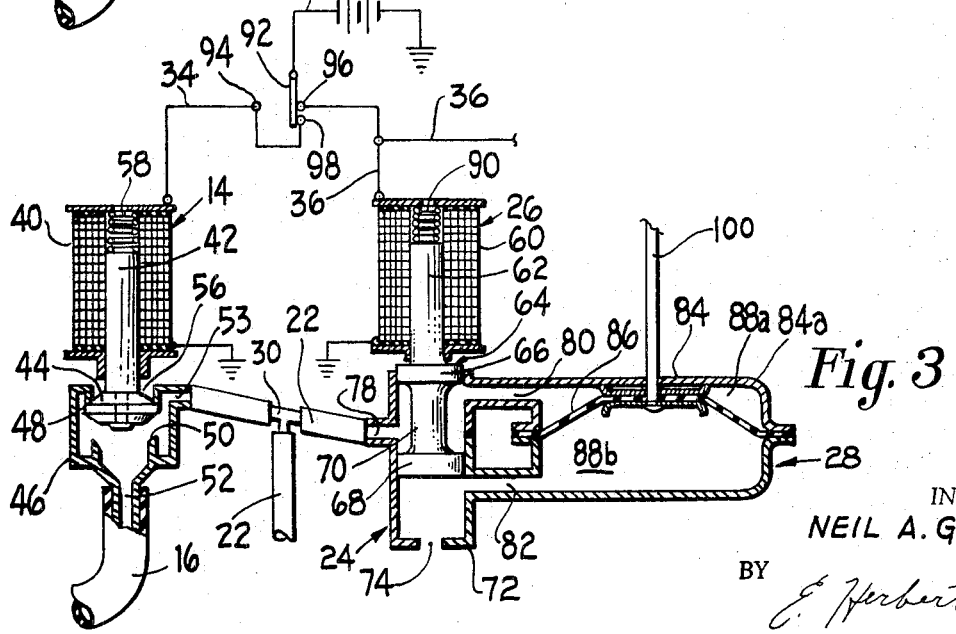
Fig. 2
Fig. 3
INVENTOR.
NEIL A. GOWANS
BY
E. Herbert Liss
ATTORNEY.

United States Patent Office 3,531,957
Patented Oct. 6, 1970

3,531,957
DOOR LOCKING SYSTEM
Neil A. Gowans, Buffalo, N.Y., assignor to Trico Products Corporation, Buffalo, N.Y.
Continuation of application Ser. No. 690,866, Dec. 15, 1967. This application Aug. 19, 1968, Ser. No. 757,520
Int. Cl. E05b 65/38
U.S. Cl. 70—264         7 Claims

ABSTRACT OF THE DISCLOSURE

A solenoid activated master valve controls the communication between a vacuum source (intake manifold) and solenoid operated control valves connected to vacuum operated diaphragm type servo-motors, a control valve and servo-motor being disposed within each door of a motor vehicle to operate the locking mechanism. Vacuum is communicated through the control valve to the unlocking side of the servo-motor when it is deenergized if the master valve is energized. If the master valve and control valves are energized, vacuum is communicated to the locking side of the servo-motor. A manual control switch selectively energizes either the master control valve alone or the master control valve and the control valves simultaneously.

---

This application is a continuation of application Ser. No. 690,866 filed Dec. 15, 1967 (now abandoned).

BACKGROUND OF THE INVENTION

The present invention relates to door locking systems for automotive vehicles and, more particularly, to an improved, simplified electro-pneumatic system utilizing a unique arrangement of control valves.

Systems for operating door locks from a remote point are known in the prior art which utilize electrically operated actuators or fluid pressure operated actuators or a combination of both. The instant invention is a combination utilizing solenoid actuated valves for controlling a pneumatic system. In previous systems separate valve actuating devices were required at each door for lock and unlock operations and a central distributor valve was required to distribute the pressurized fluid (positive or negative). A separate conduit to each door was required for locking and unlocking which resulted in a bulky harness of rubber conduits. Certain of these systems with simplified harness systems provided for remote locking only and manual unlocking at each door.

SUMMARY

By means of a unique arrangement of valving in the present invention, a single conduit from a master valve to each door and a single electrical conductor from the master valve to each door results in a door locking system which is capable of remotely controlled locking and unlocking. The system employs a pneumatically actuated servo-motor of the diaphragm type at each door. A movable diaphragm divides the servo-motor into a locking compartment and an unlocking compartment. Secured to the diaghragm is an operating rod which actuates the locking mechanism. At each servo-motor there is provided a solenoid operated control valve for controlling fluid communication from a fluid source to the servo-motors through the valve. The valve in its unenergized normal position permits communication to the unlocking side of the servo-motor.

A solenoid operated master valve is provided which controls communication between the source of fluid pressure and all of the control valves at each door. When the master valve is unenergized, communication between the fluid pressure source and the control valves at the doors is interrupted; when it is energized, fluid communication is permitted. Thus, when the master valve alone is energized, all of the servo-motors are energized through the control valves to an unlocking condition because of the normally open passageway to the unlocking compartment of the servo-motor through the control valves at each door. When both the master valve and the control valves are energized, a locking operation takes place. A manual switch is provided which has a first position for energizing the master valve alone and a second position for energizing the control valves at the doors and the master valve simultaneously. Thus, only a single fluid conduit is required between the master valve and each door to provide remote locking and unlocking.

The principal object of the present invention is to provide an improved, simplified electro-pneumatic remotely controlled door locking system for automotive vehicles utilizing a minimum number of conduits and components.

Another object of the invention is to provide an improved, simplified electro-pneumatic remotely controlled door locking system for automotive vehicles wherein a single fluid conduit is utilized for locking and unlocking to thereby simplify installation.

Other objects and advantages of the invention will be apparent from the following detailed description taken in connection with the accompanying drawings.

BRIEF DESCRIPTION OF THE DRAWINGS

FIG. 1 is a schematic perspective view of an automotive vehicle embodying the improved system of the present invention;

FIG. 2 is a schematic diagram showing the salient components of the door locking system; and FIG. 3 is a schematic view similar to FIG. 2 showing the door locking system actuated to a door locking position.

DESCRIPTION OF THE PREFERRED EMBODIMENTS

In FIG. 1 a vehicle 10 is shown with an engine having an intake manifold (not shown). Coupled to the intake manifold is a suitable vacuum tank 12 which is adapted to provide a constant source of vacuum when the vehicle is in operation, as is well known. While certain portions of the present system will henceforth be described as being vacuum operated, it will be appreciated that, with suitable modifications, they may be operated by the use of compressed air or hydraulic fluid. The master control valve assembly 14 of the remotely controlled door lock system is coupled to the fluid pressure tank 12 by conduit 16. This valve is also coupled to the engine intake manifold through conduit 18 and a check valve 20 secured to the fluid storage tank 12. When sufficient pressure is accumulated in storage tank 12, fluid pressure for the system may be drawn directly therefrom through the check valve 20 and conduit 16 thereby permitting operation of the system when there is little or no intake manifold vacuum. Conduits 22 connect the housing 46 of master valve assembly 14 to the door lock actuator assemblies 24 comprising control valve assembly 26 and servo-motor 28 through T 30. A manual control switch is disposed in the passenger compartment of the vehicle within reach of the operator; it has one terminal thereof connected to ground and the other terminal connected to master control valve assembly 14 through a conductor 34. Another terminal is connected to each of control valve assemblies 26 through conductors 36.

Reference is now made to FIGS. 2 and 3 where the entire system is shown in greater detail. In FIG. 2 the master control valve assembly 14 and a control valve assembly 26 are shown in the unactivated state with the servo-motor 28 in a neutral position. Master control valve assembly 14 consists of actuating means, as, for example, a solenoid coil 40 having an armature 42 with valve means shown as a poppet valve 44 secured to an end thereof and movable with the armature 42. A valve housing 46 is provided having opposed valve seats 48 and 50. The valve means 44 is movable between valve seats 48 and 50 for controlling communication between the fluid pressure source 12 and outlet port 53. A passage through valve seat 50 communicates with the fluid pressure source 12 through inlet port 52 and conduit 16. The passage through valve 48 communicates with the atmosphere through passage 56. The valve means 44 is biased to position on seat 50 by spring 58 when the solenoid actuating means 40 is deenergized. When it is energized, the valve 44 seats on valve seat 50.

The door lock actuator assembly 24 consists of the control valve assembly 26 which may be formed integrally with the servo-motor 28. The control valve assembly 26 includes a solenoid coil 60 having an armature 62 reciprocally movable therein. A spool valve 64 is formed integrally with the armature 62 and includes lands 66 and 68 having a groove 70 disposed therebetween. The spool valve 64 is slidable in a valve housing 72 having an atmospheric vent 74 at one end and atmospheric vent 76 at the other end. An inlet port 78 communicates through the interior of the housing 72 and outlet ports 80 and 82 and with the housing 84 of the servo-motor 28.

The servo-motor comprises a pair of substantially cup-shaped housing halves 84a and 84b which may be secured together in opposed relation in any suitable manner, as, for example, by crimping. A diaphragm 86 is secured peripherally between the housing halves 84a and 84b. The diaphragm or movable wall 86 divides the servo-motor into compartments 88a and 88b. The servo-motor 28 has secured to its diaphragm 86 an operating rod 100 movable therewith which is connected at its outer end to linkage in latch lock 102. In the example shown and described herein, when the operating rod 100 is moved upwardly from the position shown in FIG. 2 to the position shown in FIG. 3, the latch lock 102 is in a locked condition. When the operating rod 100 is moved from the position shown in FIG. 2 downwardly, the latch lock 102 is in an unlocked condition. The latch lock may also be operated to locked or unlocked condition mechanically at each door by operation of push button 104. It will of course be understood that, depending on the type of linkage in the lock, the directions for locking and unlocking may be reversed. The outlet port 80 of control valve assembly 26 communicates with compartment 88a and the outlet port 82 communicates with compartment 88b. The spool valve 64 is movable between a first position shown in FIG. 2 wherein outlet port 82 communicates with inlet port 78 through groove 70 and outlet port 80 communicates with atmospheric vent 76 to a second position shown in FIG. 3 where outlet port 82 is in communication with vent 74 while outlet port 80 is in communication with inlet port 78 through groove 70 of valve 64. The spool valve 64 is biased by spring 90 to the first position shown in FIG. 2.

The manual control 32 may be a self-centering double throw switch movable from a central open position to either a first position where movable contactor 92 engages stationary contact 94 or to a second position wherein movable contactor 92 engages stationary contacts 96 and 98. Stationary contacts 94 and 98 may be electrically connected to each other.

The electrical system comprises a battery or voltage source 106 in the motor vehicle 10. The movable contactor 92 is connected to battery 106 by conductor 108. Stationary contacts 94 and 98 are connected to one terminal of the solenoid 40 by conductor 34. The other terminal of the solenoid is connected to ground. Stationary contact 96 is connected to one terminal of solenoid 60 of control valve 26, the other terminal of solenoid 60 being connected to ground. The pneumatic system includes the fluid pressure source 12 which is connected to inlet port 52 of master control valve assembly 14 through conduit 16. An outlet port 53 of housing 46 is connected to inlet ports 78 of control valve assembly 26 through T 30 and conduits 22.

The operation of the system is as follows: With the manual control 32 in neutral position, the actuating means, solenoid 40 of master control valve 14, and actuating means, solenoid 60 of control valve 26, are unenergized. The inlet port 52 from pressure source 12 is closed and the servo-motor 28 is dormant. It should be noted that, in this neutral position, no air pressure resistance is offered by the remotely controlled system if it is desired to operate the manual push button 104; movement of the push button 104 downward to lock the latch lock 102 would move the diaphragm 86 upwardly, forcing the air in compartment 88a through outlet port 80 to the atmosphere through vent 76. If it is desired to raise the push button 104, the diaphragm would move downwardly, foreing air from compartment 88b to outlet port 82, groove 70, inlet passage 78, conduit 22, T 30, outlet passage or port 53 through atmospheric vent 56.

Movement of the manual control 32 to a first position in engagement with contact 94 would close the circuit from battery 106, contactor 108, movable contact 92, stationary contact 94, conductor 34, solenoid 40 to ground. Poppet valve 44 would be raised from seat 50 against the bias of spring 58, opening port 52 through valve seat 50 and closing passage 56 through valve seat 48. Vacuum would be communicated through conduit 16, inlet port 52, outlet port 53, T 30, conduit 22, inlet port 78, groove 70, outlet port 82 to compartment 88b of servo-motor 28, drawing downwardly diaphragm 86 to perform an unlocking operation.

If it is desired to lock the latch 102, the movable contactor 92 is moved to the second position, illustrated in FIG. 3, wherein it engages contacts 96 and 98, thereby closing a circuit from battery 106 through conductor 108, movable contactor 92, stationary contact 98, conductor 34 and solenoid 40 to ground, thereby energizing the master valve 14. This would also close a circuit from battery 106 through conductor 108, movable contactor 92, stationary contact 96 and conductors 36 through solenoid 60 to ground, thereby energizing control valve assembly 26. Master valve assembly 14, being energized as for the unlocking operation, would permit flow therethrough similarly to inlet 78 of control valve 26. Spool valve 64 would move to the position shown in FIG. 3, permitting conduit passage of vacuum through inlet port 78, groove 70, inlet port 80 to compartment 88a, of servo-motor 28. Compartment 88b would be vented through atmospheric vent 74 and inlet passage 82, thereby moving the diaphragm upwardly to the position seen in FIG. 3 to perform a locking operation.

It should now be apparent that an improved door locking system has been provided utilizing a single solenoid at each door for operating a control valve at either a locking or unlocking position and wherein only a single conduit is required from the master valve to each control valve. This substantialy simplifies installation and reduces the complexity of the components required as compared with previously known devices. A certain specific embodiment of the invention has been shown and described for the purpose of illustration, but it will be apparent that various modifications and other embodiments are possible within the scope of the invention. It is to be understood therefore that the invention is not limited to the specific arrangement shown, but in its broadest aspects it includes all equivalent embodiments and modifications which come within the scope of the invention.

What is claimed is:

1. In a motor vehicle door locking system comprising a plurality of doors, a latch lock operatively associated with each door including locking means manually manipulatable to a first position to unlock the latch for manual door opening and being manually displaceable to a second position for locking the latch to prevent manual door opening and fluid pressure differential operated servo motor means coupled to said latch lock constituting alternative means for acuating said locking means to said first and second positions, the improvement comprising a control system for remotely actuating a plurality of said servo-motors comprising a master valve assembly, a plurality of control valve assemblies, one disposed at each servo-motor, said master valve assembly including an outlet port and valve means for controlling communication between a source of fluid pressure and said control valve assemblies through said outlet port, actuating means for controlling said valve means; each of said control valve assemblies including an inlet port in communication with said outlet port of said master control valve assembly, first and second outlet ports in communication with said servo-motor, a control valve for alternatively permitting communication between said inlet port and said first outlet port or said second outlet port, respectively, to cause actuation of said servo-motor in a first direction or a second direction, respectively, one direction of actuation being effective to cause locking of said latch lock, the other direction of actuation being effective to cause unlocking of said latch lock actuating means for operating said control valve from said first position to said second position when activated, said control valve being normally disposed in said first position when said actuating means is deactivated, and a manually operated controller having a neutral position, a first operative position for activating said master control valve actuating means alone, and a second operative position for activating said master control valve and said control valve actuating means simultaneously.

2. A door locking system according to claim 1 wherein said master valve assembly actuating means includes a solenoid for operating said valve.

3. A door locking system according to claim 1 wherein said control valve assembly actuating means includes a solenoid for operating said valve.

4. A door locking system according to claim 1 wherein said master valve assembly and said control valve assembly actuating means include solenoids for operating said valve.

5. A door locking system according to claim 3 wherein said servo-motor comprises a chamber divided into a first compartment and a second compartment by a movable wall having an actuating rod secured thereto and wherein one of said control valve assembly outlet ports communicates with one of said compartments when said control valve assembly is energized and wherein the other of said outlet ports communicates with the other of said compartments when said control valve assembly is deenergized.

6. A door locking system according to claim 4 wherein said manual controller comprises an electrical switching device for controling energization of said solenoids.

7. In an electropneumatic door locking system for motor vehicles including a door having a mechanical latch-lock mechanism therein; a combination comprising a pneumatic servo-unit comprising a housing enclosing a chamber, a movable wall element dividing said chamber into first and second compartments, a latch operating link secured at one end to said movable wall for movement therewith and at its other end to said mechanical latch-lock mechanism, said movable wall and latch operating link being movable in response to application of a pressure differential across said movable wall, and solenoid operated valve means at each servo-unit for controlling communication between said servo-unit and a source of fluid pressure and between an atmospheric vent and said servo-unit comprising a solenoid coil and a reciprocating armature controlled by said solenoid coil, a valve housing, a valve member recriprocable in said valve housing operatively connected to said armature and actuated thereby, first and second port means in said valve housing communicating with said first and second compartments, respectively, a single fluid conduit connecting said valve housing to a source of fluid pressure and electrical switch means for energizing said solenoid coil, whereby said valve member can be selectively actuated to effect a pressure differential in a first direction or a second direction across said movable wall to effect a locking or unlocking operation.

References Cited
UNITED STATES PATENTS

| | | | |
|---|---|---|---|
| 2,493,377 | 1/1950 | Zeilman | 60—54.5 |
| 2,877,795 | 3/1959 | Cocklin | 137—593 |
| 2,918,042 | 12/1959 | Jensen et al. | 91—459 |
| 2,974,742 | 3/1961 | Tyler | 180—113 |
| 3,019,848 | 2/1962 | Garvey et al. | 180—82 |
| 3,198,083 | 8/1965 | Farr et al. | 91—1 |
| 3,357,215 | 12/1967 | Riester et al. | 70—264 |

MARVIN A. CHAMPION, Primary Examiner

R. L. WOLFE, Assistant Examiner